United States Patent [19]

Schellhorn et al.

[11] Patent Number: 5,382,857
[45] Date of Patent: Jan. 17, 1995

[54] ELECTRIC DRIVE UNIT FOR ADJUSTMENT SYSTEMS IN MOTOR VEHICLES

[75] Inventors: Gerhard Schellhorn, Coburg; Helmut Sesselmann, Steinach, both of Germany

[73] Assignee: Brose Fahrzeugteile GmbH & Co. KG, Coburg, Germany

[21] Appl. No.: 100,489

[22] Filed: Jul. 30, 1993

[30] Foreign Application Priority Data

Aug. 1, 1992 [DE] Germany ............... 4225496

[51] Int. Cl.⁶ ............... H02K 5/00; H02K 11/00
[52] U.S. Cl. ............... 310/83; 310/42; 310/71; 310/89
[58] Field of Search ............... 310/42, 71, 80, 83, 310/68 R, 51, 89; 439/52, 53, 112, 577, 927

[56] References Cited

U.S. PATENT DOCUMENTS

| | | | |
|---|---|---|---|
| 4,398,135 | 6/1983 | Maxa | 310/68 B |
| 4,935,652 | 8/1990 | Busch et al. | 318/443 |
| 5,013,952 | 5/1991 | Sekine et al. | 310/239 |
| 5,015,897 | 5/1991 | Inagaki et al. | 310/83 |
| 5,066,878 | 11/1991 | Sekine et al. | 310/68 C |
| 5,144,738 | 9/1992 | Oyafuso | 29/596 |
| 5,159,221 | 10/1992 | Miyazaki et al. | 310/239 |
| 5,194,769 | 3/1993 | Ade et al. | 310/51 |

FOREIGN PATENT DOCUMENTS

474904A1 12/1990 European Pat. Off. .

Primary Examiner—Kristine L. Peckman
Assistant Examiner—D. R. Haszko
Attorney, Agent, or Firm—Christie, Parker & Hale

[57] ABSTRACT

The invention relates to an electric drive unit for adjustment systems in motor vehicles, more particularly for an electrically operated window winder. The electric drive unit comprises an electric motor, a gear unit into which the extended motor shaft of the electric motor projects, and a current unit with a plug or adequate solder spots. The current unit is designed as an intermediate rail for connecting the electric motor and gear housing. When using a commutator motor, the brush holder of the commutator motor is incorporated in the intermediate rail. The intermediate rail preferably forms a structurally uniform block with the plug, and, when additionally using an electronics unit, also with the electronics unit.

17 Claims, 2 Drawing Sheets

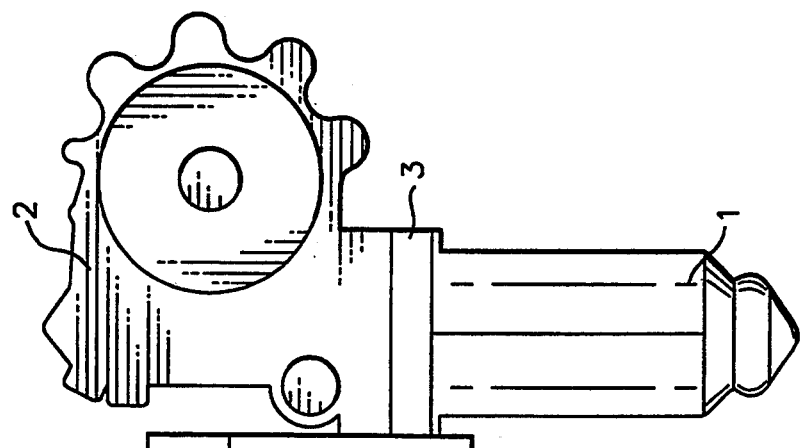
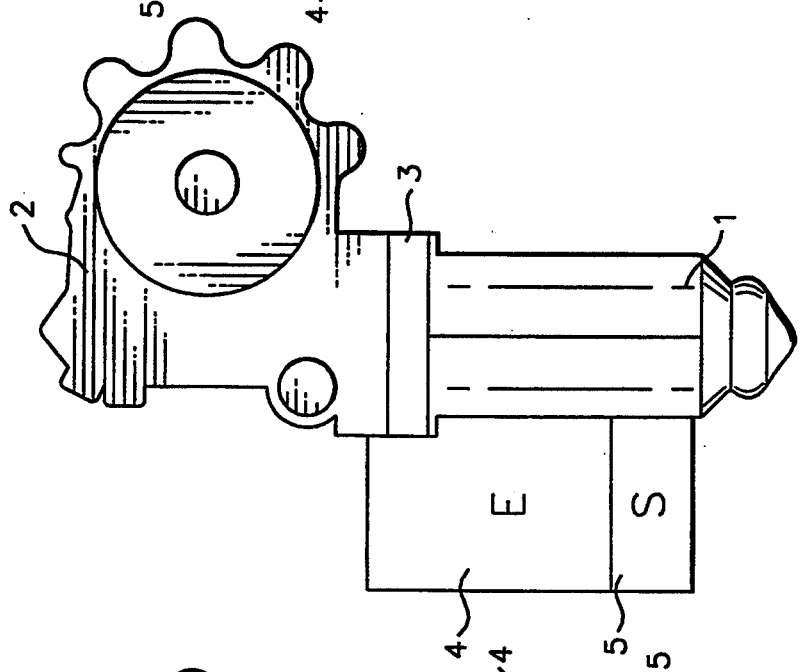
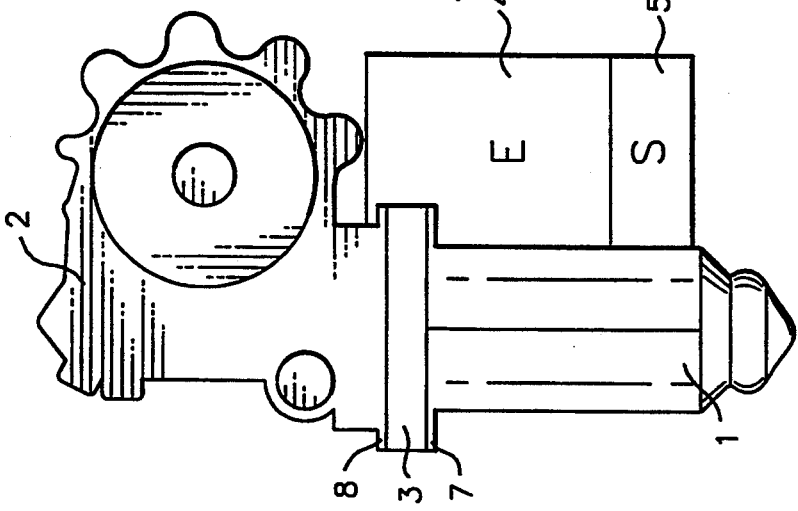

ELECTRIC DRIVE UNIT FOR ADJUSTMENT SYSTEMS IN MOTOR VEHICLES

BACKGROUND OF THE INVENTION

The invention relates to an electric drive unit for adjustment systems in motor vehicles, more particularly for an electrically operated window winder.

From EP 0474904, the disclosure of which is incorporated herein fully by reference, a commutator gear drive unit is known which is constructed in the following manner. The motor housing is adjoined directly by the gear housing into which the extended motor shaft of the electric motor projects. The extended motor shaft serves as the gear shaft. An electronics housing contains a one-dimensional conductor plate which is fitted with an outer connection plug and with a brush holder and brush socket. The electrical connections of all the component parts are more particularly contacted by flood bath welding.

All the electronic or electrical and mechanical components are mounted in a common housing to which the motor is connected by flanges.

The disadvantage of this solution lies in the high degree of specialization and thus insufficient flexibility regarding desirable modifications. Thus, small changes in the system often cause incomparably high expense.

Another variation of the motor or moving the gear housing area containing the electronics to another position (e.g., for reasons of space) always entails having to make a new housing. The tooling costs connected with this are considerable.

Particularly in the automobile industry one and the same principle of a technical solution is often evaluated in a very large number of embodiments. Therefore, particularly here a lack of flexibility often leads to special expense such as in storage, logistics and handling.

SUMMARY OF THE INVENTION

The object of the invention is to develop an electric drive which can be adapted easily and cost-effectively to special technical requirements such as changed motor capacity, inclusion or omission of electronics, or a mirror symmetrical arrangement of the electronics housing for reasons of space. The high flexibility should guarantee a wide variability with at the same time a greatly reduced number of parts.

According to the invention, an electric drive unit for adjustment systems in motor vehicles comprises an electric motor with an extended motor shaft, a gear unit coupled to said extended motor shaft, a gear housing housing said gear unit, and an intermediate rail connecting the electric motor and the gear housing whereby the intermediate rail serves as a current unit for the electric motor and comprises a plug or solder spots. The intermediate rail is designed as a current unit for connecting the electric motor and the gear housing. Preferably, the intermediate rail is connected to a plug, both forming one structurally uniform block.

The intermediate rail supplies electricity to the electric motor. To this end, current is supplied to the plug or adequate solder spots of the intermediate rail.

Any electronics which may be present are located in a separate housing separated from the gear housing and are coupled to the intermediate rail by a plug connection. Better still the electronics are integrated with the intermediate rail into one structural unit which is particularly safeguarded against breakdown as an insert part.

The electronics comprises, e.g., comfort electronics and jam protection means for jam protection in a vehicle door. When using a commutator motor the brush holder of the commutator motor is a constituent part of the intermediate rail.

The increasing miniaturization allows under certain circumstances the electronics to be placed solely in the intermediate rail which saves conductor paths and a separate housing part which are otherwise necessary.

Where this is not possible the electronics must be mounted with their housing on the periphery of the intermediate rail. Where the electronics do not enclose the plug, the plug is attached on the opposite side.

In order to be able to take into account changes in the space conditions, the structural group containing the intermediate rail with the electronics and the plug is designed so that it can be mounted turned round. The turning angle preferably amounts to 180 degrees. However, other intermediate positions can also be provided. Also, it is possible to tilt the structural group in the plane of the motor and gear housing.

Drive variations which are to have no electronics do not need any new gear housing. They are provided with an intermediate rail equipped according to requirements. Different motor variations can also be readily combined with gearing and its unchanged housing by using the intermediate rails according to the invention. Where necessary, the intermediate rail can also be combined with adapters in order to compensate for changed distances between the flanges of the gear housing and motor or different connection measures.

If sensors are to be used for monitoring the motor parameters than these are preferably integrated into the intermediate rail. A Hall element, for example, is suitable for monitoring the rotational speed of the armature shaft and its direction of rotation. A temperature sensor or thermo-element can be used to monitor the temperature to avoid damage through overheating.

In order to avoid a separate conductor path, it is also possible to connect the power supply line of the commutator brush of a commutator motor directly to a relay.

The invention may be used with particular advantage in the mass production of electrical drive units which are built to meet special requirements through a combination of different motor and gear variations.

BRIEF DESCRIPTION OF THE DRAWINGS

The features of a specific embodiment of the best mode contemplated of carrying out the invention are illustrated in the drawings, in which:

FIGS. 1a, 1b and 1c show different installation positions of an electric drive unit with an electronics unit mounted on the periphery of the intermediate rail and having an integrated plug connection;

DETAILED DESCRIPTION OF THE SPECIFIC EMBODIMENT

Figure 2A:
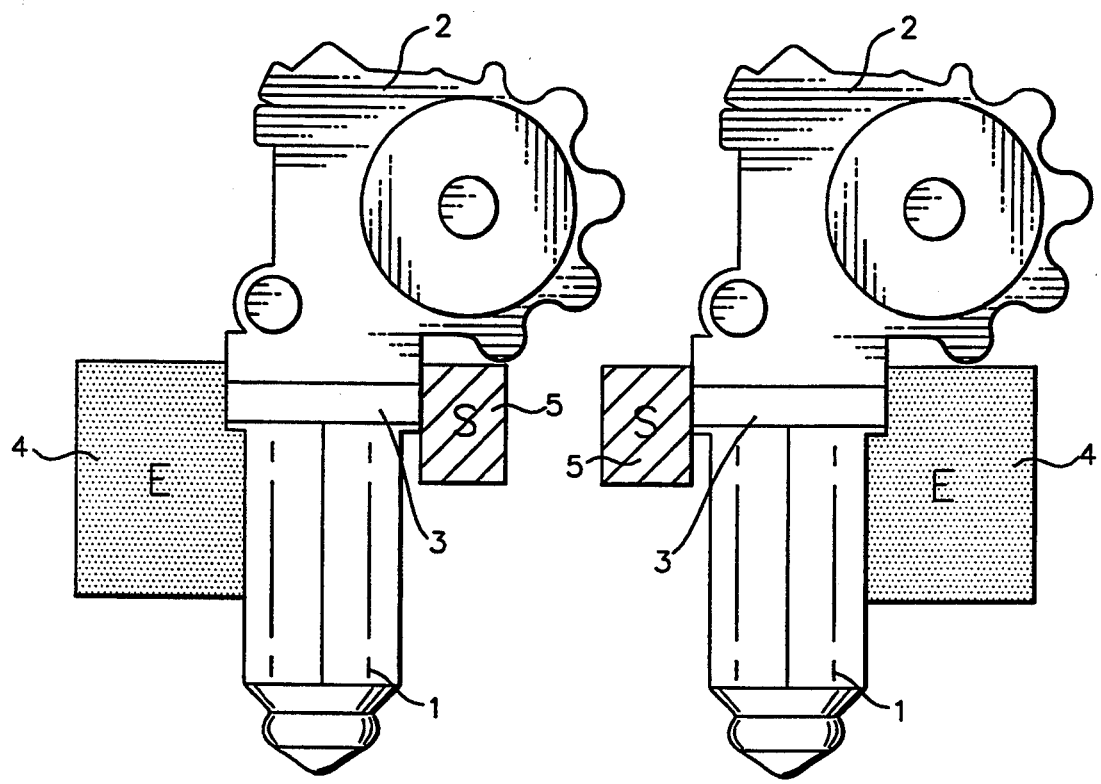
FIGS. 2a, 2b and 2c show an electric drive unit as shown in FIG. 1 but with a separately mounted plug connection.

FIGS. 1a, 1b, and 1c show examples of the flexible use of a structural unit which consists of an intermediate rail 3 connecting an electric motor 1 and a gear housing 2, and a peripherally mounted electronics unit 4. A plug 5 is integrated in the electronics unit 4.

The electronics unit 4 is physically and electrically connected to the intermediate rail 3. The intermediate rail 3, the electronics unit 4 and the plug 5 form one structurally uniform block. The intermediate rail 3 supplies electricity to the electric motor 1. Current is supplied to the plug 5, and from the plug 5 to the electronics unit 4 and the intermediate rail 3.

The electronics unit 4 comprises comfort electronics and jam protection means for jam protection in a vehicle door.

The motor shaft of the electric motor 1 projects into the gear housing 2 and is coupled to the gear. The electric motor 1 and the gear housing 2 both comprise flanges 7, 8 (as shown in FIG. 1a) whereby the intermediate rail 1 connects these flanges 7, 8. The thickness of the intermediate rail 1 corresponds to the distance between the two flanges 7, 8.

By turning said structural unit about the axis of the motor 1 (compare FIG. 1a with FIG. 1b) or by swivelling the structural unit in the plane of the motor 1 and gear housing 2 (compare FIG. 1b and 1c), it is possible to adapt to different spatial conditions, for example for an electric window winder with comfort electronics and jam protection in a vehicle door.

In case of a simple electric drive unit the electronics unit 4 can be omitted, but not however the intermediate rail 3. Its use guarantees constant structural conditions between the electric motor 1 and the gear housing 2.

The intermediate rail 3 comprises solder spots or a plug for the electrical contact. The plug may also be mounted peripherally.

The invention guarantees that electric drive units can be easily adapted to various requirements and wishes of the customers, particularly regarding the electronics function. Particularly in the automobile industry, the connection requirements (e.g., electric plug connections) and the desired electronic functions differ very considerably from customer to customer.

The corresponding modifications which are necessary are now undertaken according to the invention by using an intermediate rail 3. Even if adaptions have to be made on the intermediate rail 3 and/or the electronics unit 4 and/or the plug 5, this is very much less expensive than making adaptions of the gear housing 2. The intermediate rail 3 and the electronics unit 4 are not subject to the high precision demands of the gear and the gear housing 2, since these are hardly stressed mechanically. They are substantially carriers of electric or electronic components.

The electric or electronic components of the intermediate rail 3 and/or the electronics unit 4 are relays, hybrids, throttles, and active or passive structural elements.

The high flexibility achieved by the invention and the severely reduced expense incurred when making adaptions are the basis for a standardized structural series with reduced variety of structural components.

Figure 2B:
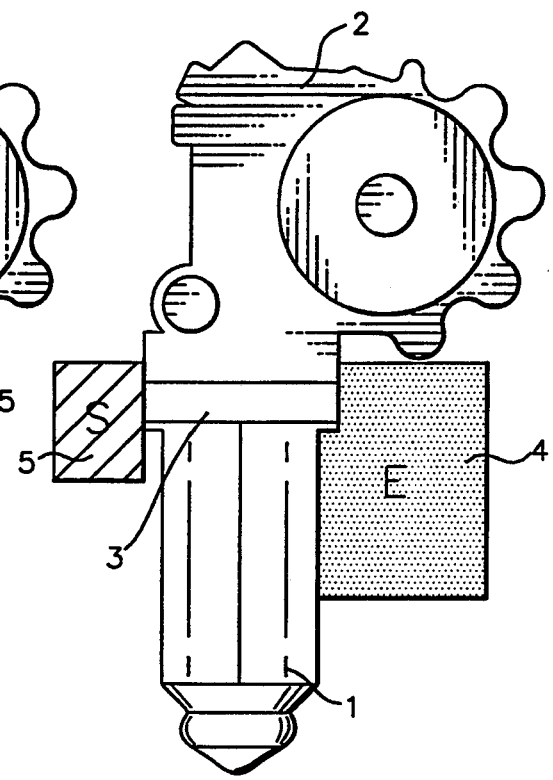
Figure 2C:
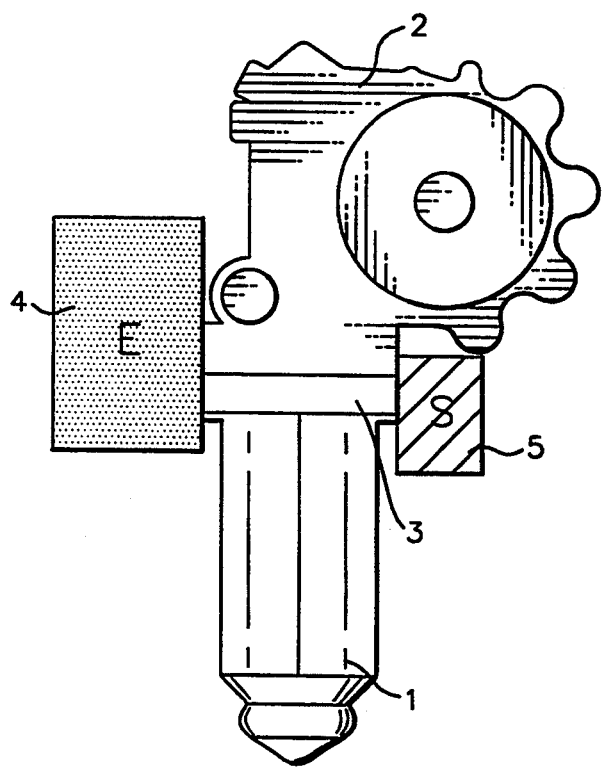

The drive unit shown in FIGS. 2a, 2b and 2c only differ from those previously described in that the electronics unit 4 and plug 5 are mounted on opposite sides of the intermediate rail 3.

Figure 3:
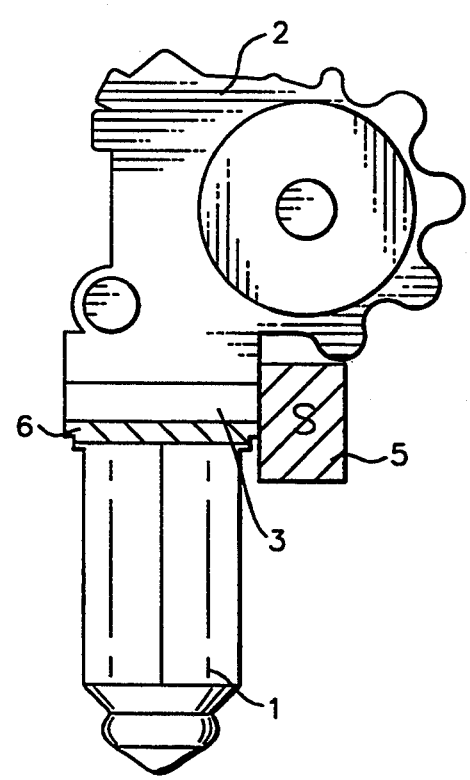
FIG. 3 shows an electric drive unit with the electronics unit integrated in the intermediate rail and with an adaptor for adapting to the connecting conditions of a smaller motor.

FIG. 3 shows a drive unit without an external electronics unit. The electronics is integrated in the intermediate rail 3 and is designed as an insert part with same. A further reduction in space and greater stability against outside factors are hereby achieved.

When using a commutator motor having a commutator brush and a brush holder holding the commutator brush, the brush holder of the commutator motor is incorporated in the intermediate rail.

Also, when using a commutator motor, at least one part of the electric and, where applicable, electronic structural elements is supported by the brush holder and thus locally fixed by same. It is thereby possible to dispense with a separate plate as the supporting element. The electrical connections required between the structural elements are made direct. This technology is cost-effective and space-saving. In many cases it allows the omission of a separate electronics housing.

In order to complete the drive unit when using a smaller motor 1, an adaptor 6 connected to the intermediate rail 3 is used. It allows coupling with the gear housing 2 even with different connecting measures and spacial conditions on the pole dish. Further, it is possible to make the intermediate rail 3 itself compatible with different connecting measures of the motor and the gear housing 2.

By changing the tool inserts in the injection molding tool when manufacturing the rail 3 or adaptor 6, it is possible to adapt the intermediate rail 3 or adaptor 6 to the required connecting conditions.

A Hall element for sensing the rotational speed of the motor shaft and its direction of rotation is incorporated in the intermediate rail 3.

The disclosure of Appendix A is incorporated fully herein by reference.

While the invention has been described in detail with respect to certain preferred embodiments, it should be understood that the invention is not limited to those precise embodiments, and that those embodiments are instead representative examples of the many modifications and variations which would present themselves to those of skill in the art without departing from the scope and spirit of this invention, as defined in the appended claims.

What is claimed is:

1. Electric drive unit for adjustment systems in motor vehicles comprising:
    an electric motor having an extended motor shaft;
    a gear unit coupled to said extended motor shaft;
    a gear housing housing said gear unit; and
    a current bearing intermediate rail connecting the electric motor and the gear housing whereby the intermediate rail serves as a current unit for the electric motor and comprises a plug or solder spots.

2. The electric drive unit of claim 1, in which both the electric motor and the gear housing comprise a flange with the intermediate rail connecting the flanges whereby a thickness of the intermediate rail is adapted to a motor-gear combination to be used.

3. The electric drive unit of claim 1, in which the electric motor is a commutator motor having a commutator brush and a brush holder holding the commutator brush whereby the brush holder is incorporated in the intermediate rail.

4. The electric drive unit of claim 1, additionally comprising an electronics unit connected to the intermediate rail whereby the intermediate rail, the plug and the electronics unit from one structurally uniform block.

5. The electric drive unit of claim 4, in which the electronics unit and the plug are mounted together on one side of the intermediate rail.

6. The electric drive unit of claim 4, in which the electronics unit is mounted on one side and the plug is mounted on the other side of the intermediate rail offset by 180°.

7. The electric drive unit of claim 1, additionally comprising an adaptor connected to the intermediate rail, the adaptor adapting the intermediate rail to different spatial conditions between the flanges of the electric motor and of the gear housing when different electric motors and gear housings are used with an intermediate rail of constant thickness.

8. The electric drive unit of claim 1, additionally comprising a sensor incorporated in the intermediate rail.

9. The electric drive unit of claim 1, additionally comprising an electronics unit whereby the electronics unit and the intermediate rail are designed together as an insert part.

10. The electric drive unit of claim 3, additionally comprising electric or electronic components being directly electrically connected without the interposition of a common plate, whereby at least one part of said electric or electronic components is locally fixed to the brush holder.

11. The electric drive unit of claim 10 in which said electric or electronic components comprise relays.

12. The electric drive unit of claim 11, in which a power supply line of the brush of the commutator motor is directly connected to a relay.

13. The electric drive unit of claim 8, in which the sensor is a Hall element.

14. The electric drive unit of claim 10 in which said electric or electronic components comprise hybrids.

15. The electric drive unit of claim 10 in which said electric or electronic components comprise throttles.

16. The electric drive unit of claim 10 in which said electric or electronic components comprise active structural elements.

17. The electric drive unit of claim 10 in which said electric or electronic components comprise passive structural elements.

* * * * *

UNITED STATES PATENT AND TRADEMARK OFFICE
CERTIFICATE OF CORRECTION

PATENT NO. : 5,382,857
DATED : January 17, 1995
INVENTOR(S) : Gerhard Schellhorn; Helmut Sesselmann It is certified that error appears in the above-indentified patent and that said Letters Patent is hereby corrected as shown below:

On the Title Page, Item 56

```
References Cited, U.S. PATENT DOCUMENTSS,
           change "4,398,135  6/1983  Maxa..."
           to     -- 4,398,135  8/1983  Busch et al... --.

References Cited, U.S. PATENT DOCUMENTS,
           change "4,935,652  8/1990  Busch et al..."
           to     -- 4,935,652  6/1990  Maxa... --.

Column 1, line 15, after "gear" insert -- drive --.
Column 2, line 17, change "round" to -- around --.
Column 2, line 34, change "than" to -- then --.
Column 3, line 45, change "adaptions" to
           -- adaptations --.
Column 3, line 48, change "adaptions" to
           -- adaptations --.
Column 3, lines 59,60, change "adaptions" to
           -- adaptations --.
Column 4, line 67, change "from" to -- form --.
```

Signed and Sealed this

Twenty-second Day of August, 1995

*Attest:*

BRUCE LEHMAN

*Attesting Officer*          Commissioner of Patents and Trademarks